United States Patent
Sneed et al.

(10) Patent No.: US 8,351,190 B1
(45) Date of Patent: Jan. 8, 2013

(54) SELF-CONTAINED GREETING CARD KIOSK APPARATUS

(76) Inventors: James Sneed, Harvey, IL (US); Sabrina Sneed, Harvey, IL (US); Tracey Sneed, Harvey, IL (US)

(*) Notice: Subject to any disclaimer, the term of this patent is extended or adjusted under 35 U.S.C. 154(b) by 231 days.

(21) Appl. No.: 12/957,092

(22) Filed: Nov. 30, 2010

(51) Int. Cl.
*G06F 1/16* (2006.01)

(52) U.S. Cl. ............. 361/679.01; 361/679.02; 700/233; 700/235

(58) Field of Classification Search ............. 361/679.01, 361/679.02
See application file for complete search history.

(56) References Cited

U.S. PATENT DOCUMENTS

| | | | | |
|---|---|---|---|---|
| D229,526 S | * | 12/1973 | Saidel | D6/448 |
| D257,705 S | * | 12/1980 | Framer | D6/421 |
| D261,582 S | * | 11/1981 | Genaro et al. | D6/421 |
| 5,442,567 A | * | 8/1995 | Small | 700/237 |
| 5,513,117 A | * | 4/1996 | Small | 700/233 |
| 5,615,123 A | * | 3/1997 | Davidson et al. | 700/233 |
| 6,092,054 A | * | 7/2000 | Tackbary et al. | 705/26.1 |
| 6,466,830 B1 | * | 10/2002 | Manross et al. | 700/83 |
| 6,487,280 B1 | * | 11/2002 | Akinbi | 379/100.04 |
| 7,262,957 B2 | * | 8/2007 | Doebertin et al. | 361/679.55 |
| 7,751,069 B2 | * | 7/2010 | Wen et al. | 358/1.12 |
| 2003/0220712 A1 | * | 11/2003 | Butikofer | 700/235 |
| 2008/0103627 A1 | * | 5/2008 | Torian | 700/233 |
| 2009/0069929 A1 | | 3/2009 | Nguyen et al. | |
| 2010/0191369 A1 | * | 7/2010 | Kim | 700/235 |

* cited by examiner

*Primary Examiner* — Anthony Q Edwards

(57) ABSTRACT

The self-contained greeting card kiosk apparatus is fully self-contained and provides for a user to create fully customized greetings cards and to also input and retrieve personal card creations and information for same. The apparatus provides for the creation of both visual and audio visual greetings, whether in card form or in other printed formats.

4 Claims, 5 Drawing Sheets

SELF-CONTAINED GREETING CARD KIOSK APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various devices have been offered that allow a customer to partially design a greeting card, typically through various templates, and such devices normally require the use of other existing electronic equipment, such as computers and the like, and a sales staff to assist the customer. The present apparatus is fully self-contained and provides for a user to create fully customized greetings cards, self-pay, and to also input and retrieve information. The apparatus provides a further advantage in that the free standing apparatus requires no sales staff, attendant, or support equipment during use and can therefore be positioned in remote and unique areas, such as outside of a typical retail outlet.

FIELD OF THE INVENTION

The self-contained greeting card kiosk apparatus relates to devices for the creation of greeting cards and more especially to a fully self-contained apparatus that allows fully customized greeting card creation and input and retrieval capability for and of creations.

SUMMARY OF THE INVENTION

The general purpose of the self-contained greeting card kiosk apparatus, described subsequently in greater detail, is to provide a self-contained greeting card kiosk apparatus which has many novel features that result in an improved self-contained greeting card kiosk apparatus which is not anticipated, rendered obvious, suggested, or even implied by prior art, either alone or in combination thereof.

To attain this, the self-contained greeting card kiosk apparatus is fully self-contained and provides for a user to create fully customized greetings cards and to also input and save personal card creations and information for same. The apparatus provides for the creation of both visual and audio visual greetings, whether in card form or other printed and inclusive formats. Two communication ports provide for the likes of CD and memory card inputs, as well as CD and memory card information retrieval after creation from the apparatus. Importantly, this feature provides for a user to carry their creations and return to a kiosk apparatus at any location to expand further upon previous creations, or to transfer previously created works into an apparatus.

A very important feature of the apparatus is the self-payment provision. Through this feature, no sales attendant is needed, and the apparatus can therefore be positioned almost anywhere imaginable to service customers and to accept virtually any form of payment, including but not limited to cash, cards, travelers' checks and other recognized monetary transfers and receipt.

The side panels importantly feature inwardly directed speakers so that a user can listen to their own choices and recordings and also those available from within the apparatus. By placing the speakers in opposed positions that substantially focus sound within the back and side panels, a user is afforded more privacy. Additionally, the jack allows a user to use earphones to listen to choices and recordings in total privacy.

The storage provided within the apparatus front provides for stocking the apparatus with needed card, paper, and envelope stock for a customer's needs, with storage sufficiently ample and separate to negate the need for constant apparatus attention by the supplier. The positioning of each feature of the apparatus is important in that a customer may self-serve without undue exploration for items or instructions.

Of further importance is that the apparatus provides multiple storage accessibility for storing various card stock and other paper and paper like products so that a user can access a variety of needs in creating their own cards, letters, and other desired products without having to obtain services from a sales assistant or the like. The plurality of audio visual choices is disposed upwardly within the counter. While a user may bring their own choices, choose from templates within the apparatus processor memory, or simply create, the audio visual choices may include but are not limited to selections such as rainforest greetings, ocean settings, personal greetings, and other visual and audio choices.

Thus has been broadly outlined the more important features of the improved self-contained greeting card kiosk apparatus so that the detailed description thereof that follows may be better understood and in order that the present contribution to the art may be better appreciated.

An object of the self-contained greeting card kiosk apparatus is to be fully self-contained.

Another object of the self-contained greeting card kiosk apparatus is to allow a user total creativity choice.

A further object of the self-contained greeting card kiosk apparatus is to provide electronic input and retrieval.

An added object of the self-contained greeting card kiosk apparatus is to provide for substantial privacy.

And, an object of the self-contained greeting card kiosk apparatus is to provide audio visual choices.

Still another object of the self-contained greeting card kiosk apparatus is to provide for self-payment by a customer.

Yet another object of the self-contained greeting card kiosk is to provide full service to the visually impaired.

These together with additional objects, features and advantages of the improved self-contained greeting card kiosk apparatus will be readily apparent to those of ordinary skill in the art upon reading the following detailed description of presently preferred, but nonetheless illustrative, embodiments of the improved self-contained greeting card kiosk apparatus when taken in conjunction with the accompanying drawings.

DETAILED DESCRIPTION OF THE DRAWINGS

With reference now to the drawings, and in particular FIGS. 1 through 5 thereof, the principles and concepts of the self-contained greeting card kiosk apparatus generally designated by the reference number 10 will be described.

Figure 1:
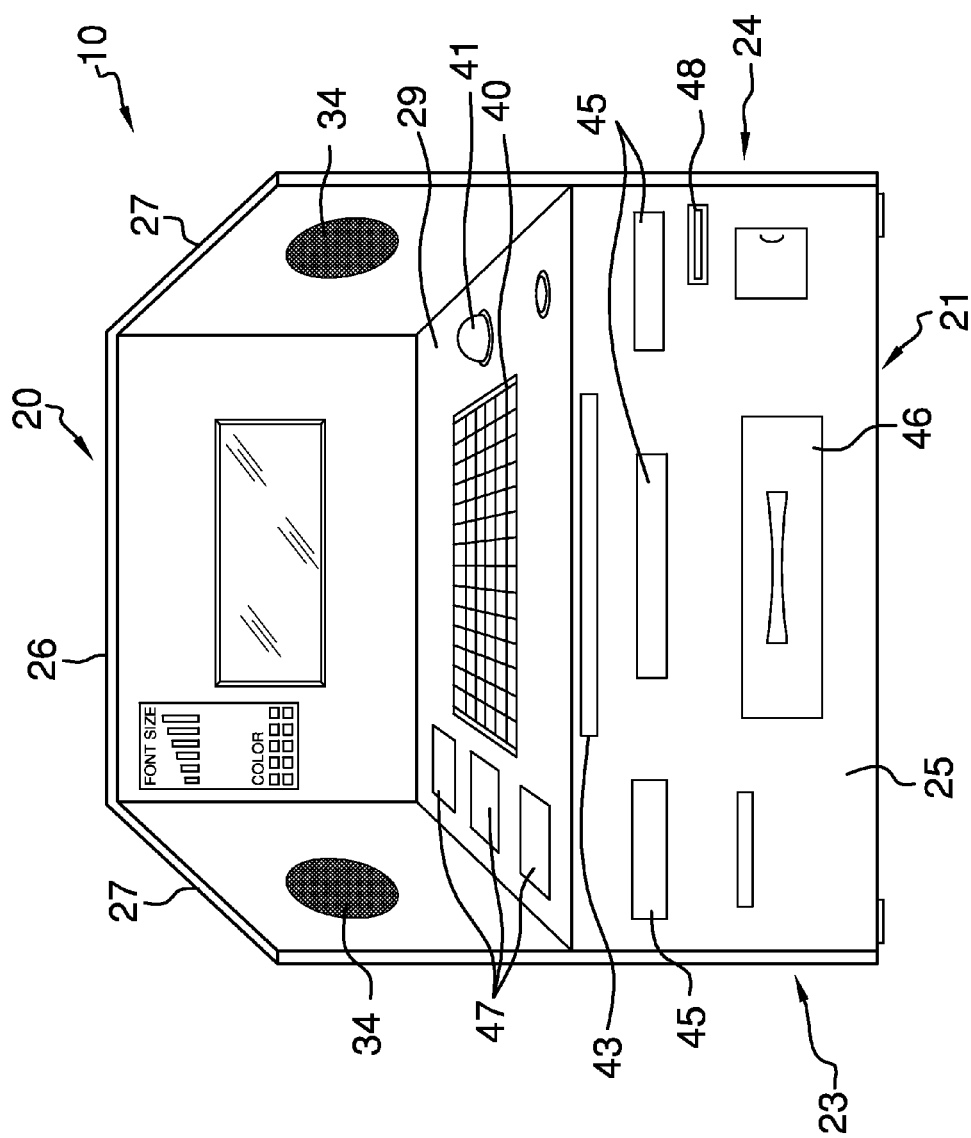
FIG. 1 is a front perspective view.
Figure 2:
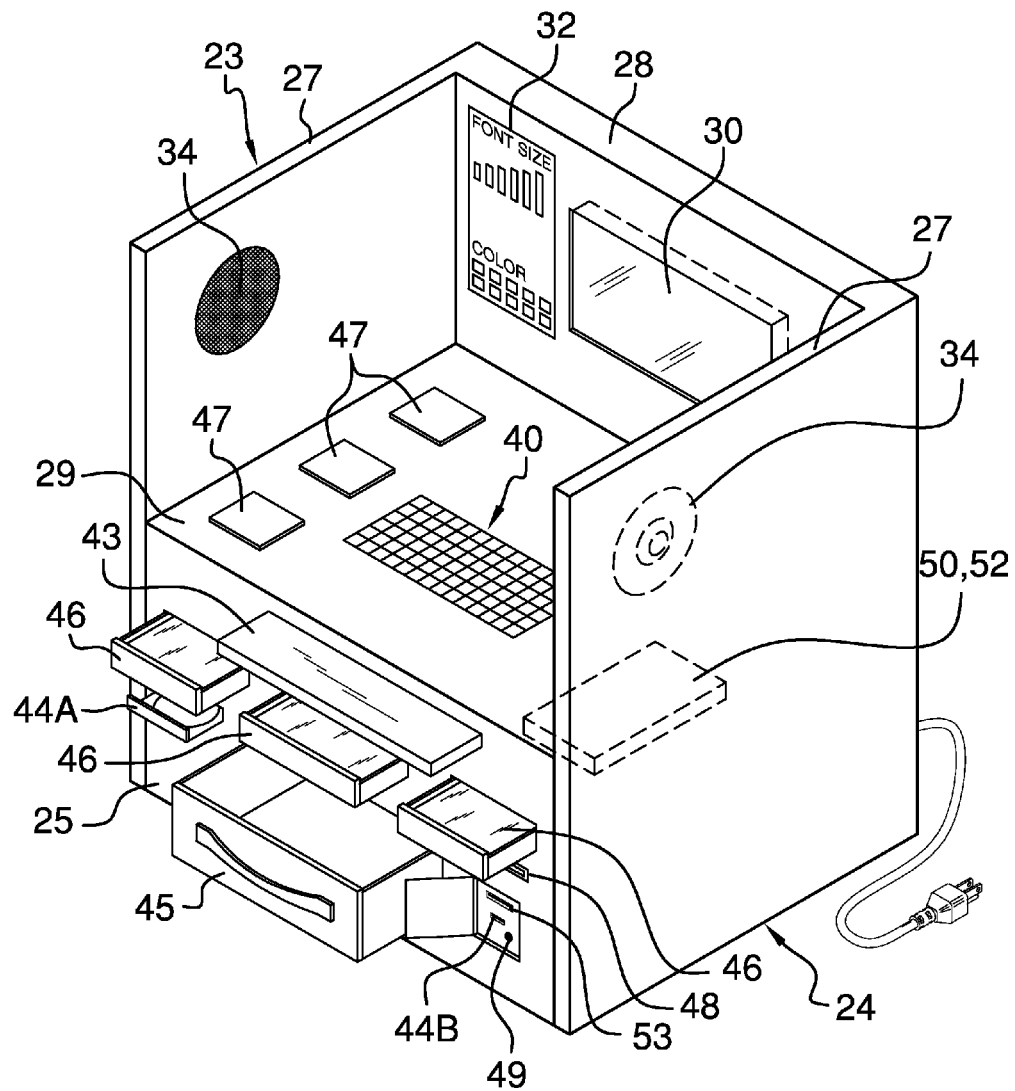
FIG. 2 is a top, side perspective view.
Figure 3:
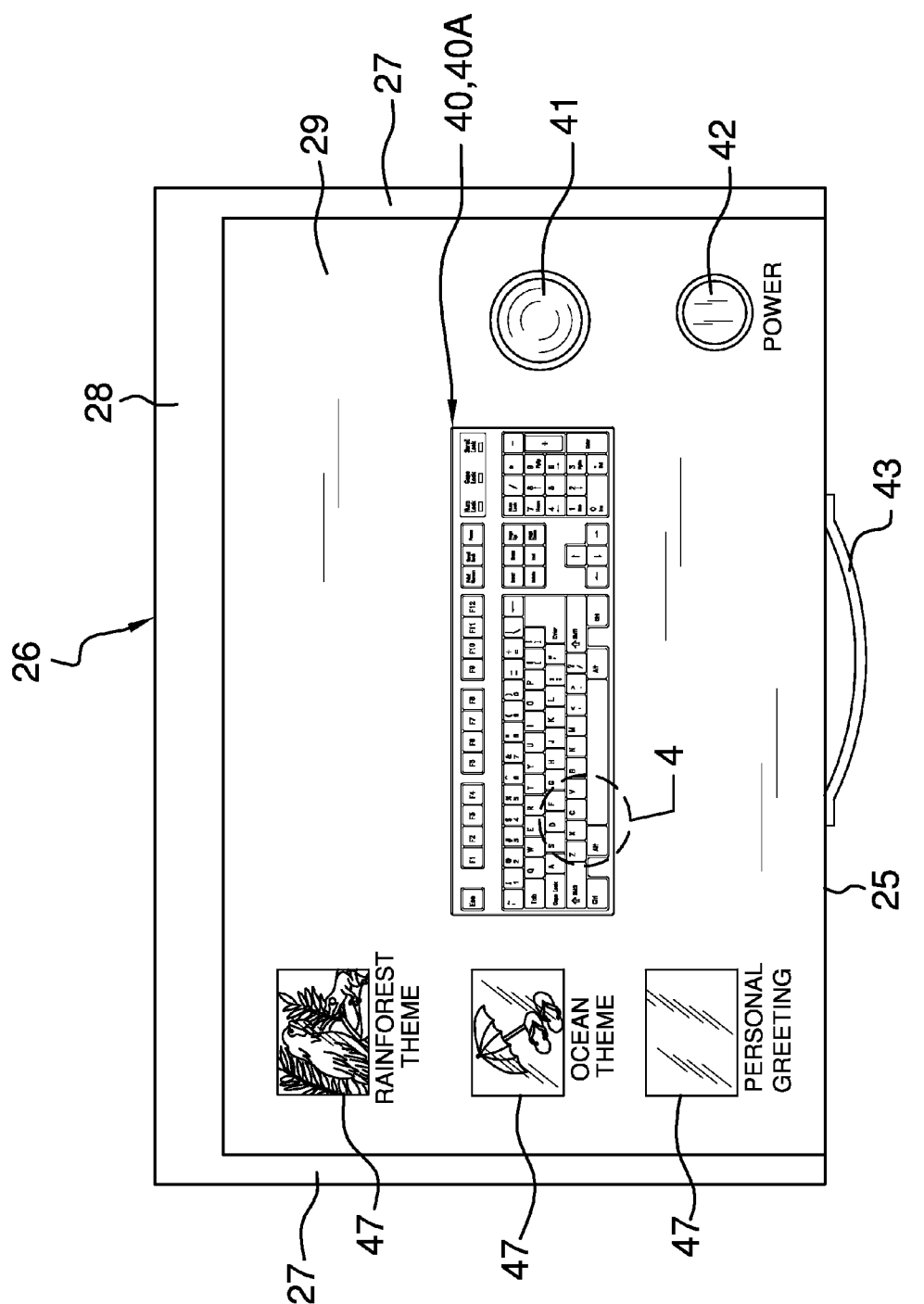
FIG. 3 is a top plan view.

Referring to FIG. 1, the apparatus 10 partially comprises the top 20 spaced apart from the bottom 21, the first side 23 spaced apart from the second side 24, and the front 25 spaced apart from the back 26. The back panel 28 is extended upwardly from the back 26. The view screen 30 is disposed inwardly within the back panel 28. The interactive preference chart 32 is disposed inwardly within the back panel 28 and provides a means for a user to choose fonts, colors, and other card and printed matter inclusions. A side panel 27 is disposed on each side adjacent to the top 20. Each side panel is connected to the back panel 28. An inwardly facing speaker 34 is disposed within each side panel. The counter 29 provides an interactive display with controls for a user. The counter 29 is disposed horizontally between the back panel 28 and the side panels, about equidistantly between the top 20 and the bottom 21. The keypad 40 is disposed upwardly within the counter 29. The mouse 41 is disposed within the counter 29, adjacent to the keypad 40. The plurality of audio visual choices 47 is disposed upwardly within the counter 29 and provides a user with choices programmed within the processor 50, should personal information not be used. The on/off 42 is disposed upwardly within the counter 29 and provides for energy savings when the apparatus 10 is not in use. Referring to FIG. 2, the jack 49 is disposed within the front 25. The plurality of drawers 45 is disposed within the front 25. The pull-out shelf 43 is importantly disposed within the front 25, adjacent to the counter 29 and provides for a user to reference any needed material immediately adjacent to the counter 29 and keypad 40. A plurality of drawers 45 is disposed within the front 25. The plurality of storages 46 is disposed within the front 25. The storages 46 provide storage and product dispensing.

The payment slot 48 is importantly disposed within the front 25 to provide instant convenience to a customer, with various methods of payment receipt. The memory card slot 53 is disposed within the front 25 and allows a user to input previously saved information for desired creations, and also to save what the user might create within the apparatus 10. The plurality of communication ports, comprising both the first communication port 44A and the second communication port 44B is disposed within the front 25 and provide other means for the user to perform functions like that provided by the memory card slot 53.

Figure 5:
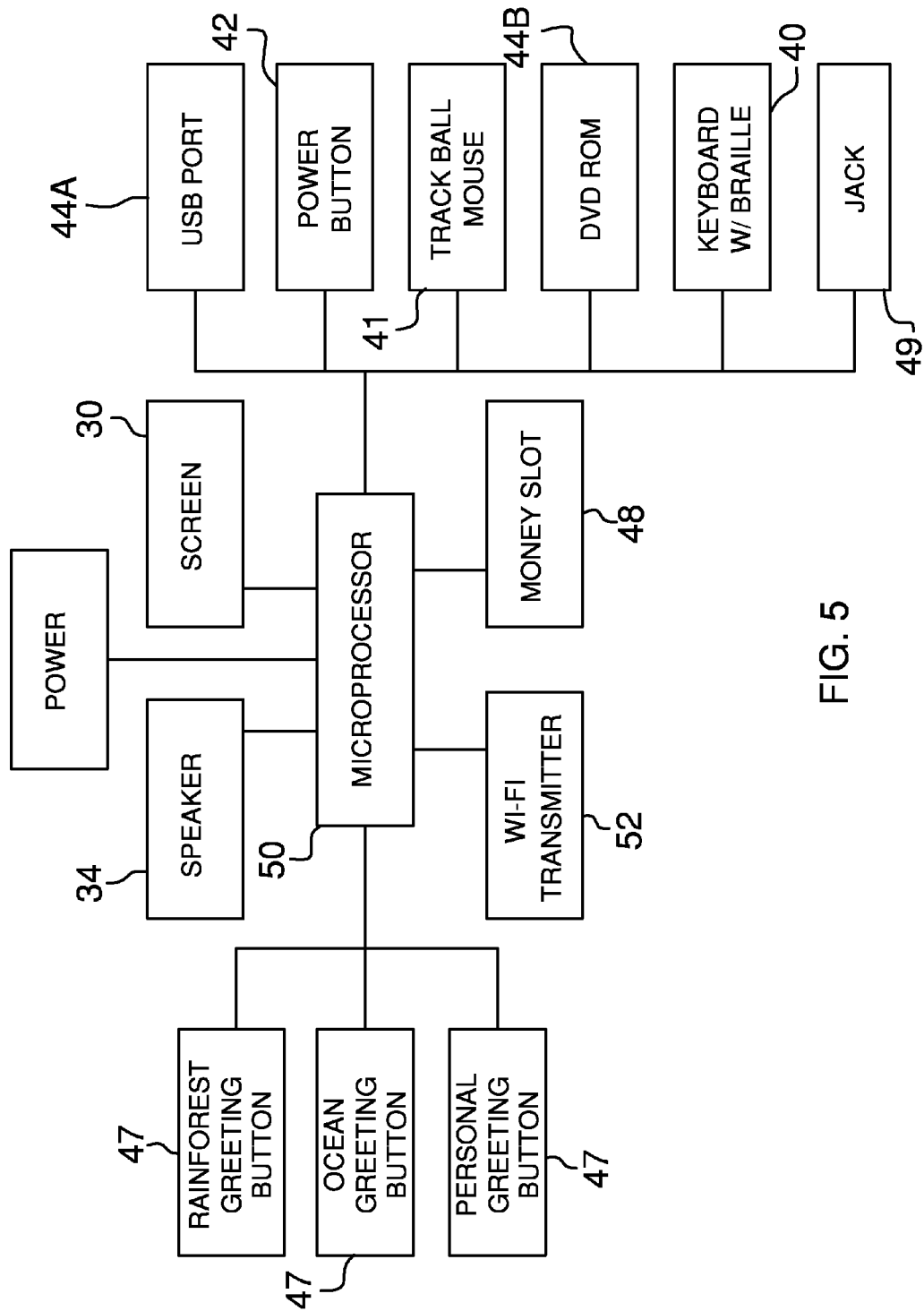
FIG. 5 is a schematic block diagram of electronic functions.

Referring to FIG. 5, the Wi-Fi device 52 is disposed under the counter 29 within the apparatus 10. The processor 50 is disposed under the counter 29. The processor 50 is in communication with the view screen 30, the preference chart 32, the keypad 40, the mouse 41, the audio visual choices 47, the on/off 42, the jack 49, the payment slot 48, the speakers 34, the communication ports, and the Wi-Fi device 52.

Figure 4:
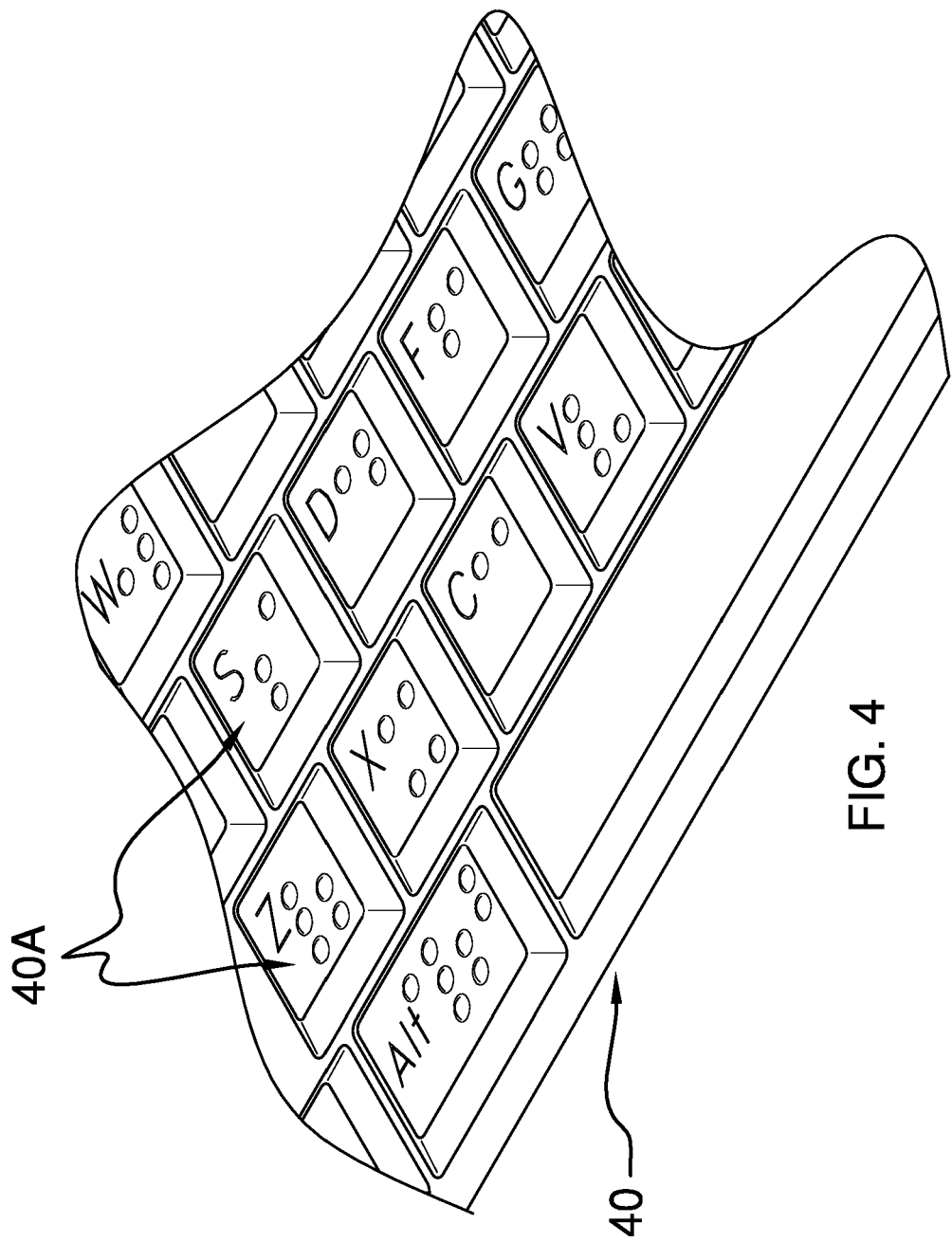
FIG. 4 is a partial exploded view of FIG. 3, highlighting the Braille system of the keypad.

Referring to FIG. 4 the keypad 40 further comprises a Braille system 40A so that visually impaired users may fully access the apparatus 10.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the self-contained greeting card kiosk apparatus may be used.

What is claimed is:

1. A self-contained greeting card kiosk apparatus comprising, in combination:
   a top spaced apart from a bottom, a first side spaced apart from a second side, and a front spaced apart from a back;
   a back panel extended upwardly from the back;
   a view screen disposed inwardly within the back panel;
   an interactive preference chart disposed inwardly within the back panel;
   a side panel disposed on each side adjacent to the top, each side panel connected to the back panel;
   an inwardly facing speaker disposed within each side panel;
   a counter disposed horizontally between the back panel and the side panels, about equidistant between the top and the bottom;
   a keypad disposed upwardly within the counter;
   a mouse disposed within the counter adjacent to the keypad;
   a plurality of audio visual choices disposed upwardly within the counter;
   an on/off disposed upwardly within the counter;
   a jack disposed upwardly within the front;
   a plurality of drawers disposed within the front;
   a pull-out shelf disposed within the front, adjacent to the counter;
   a drawer disposed within the front;
   a plurality of storages disposed within the front, the storages providing product dispensing;
   a payment slot disposed within the front;
   a memory card slot disposed within the front;
   a plurality of communication ports disposed within the front;
   a processor disposed under the counter, the processor in communication with the view screen, the preference chart, the keypad, the mouse, the audio visual choices, the on/off, the jack, the payment slot, the speakers, and the communication ports.

2. The apparatus according to claim 1 wherein the keypad further comprises a Braille system.

3. The apparatus according to claim 1 further comprising a Wi-Fi device disposed under the counter, the Wi-Fi device in communication with the processor.

4. The apparatus according to claim 2 further comprising a Wi-Fi device disposed under the counter, the Wi-Fi device in communication with the processor.

* * * * *